United States Patent
Ellison et al.

(10) Patent No.: US 10,175,441 B2
(45) Date of Patent: Jan. 8, 2019

(54) ULTRA-HIGH DENSITY PATCH SYSTEMS

(71) Applicant: Telect, Inc., Liberty Lake, WA (US)

(72) Inventors: Steven W. Ellison, Mead, WA (US); David Knaggs, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/816,906

(22) Filed: Nov. 17, 2017

(65) Prior Publication Data

US 2018/0074276 A1    Mar. 15, 2018

Related U.S. Application Data

(63) Continuation of application No. 15/046,186, filed on Feb. 17, 2016, now Pat. No. 9,829,666.

(51) Int. Cl.
*G02B 6/00* (2006.01)
*G02B 6/44* (2006.01)

(52) U.S. Cl.
CPC ......... *G02B 6/4454* (2013.01); *G02B 6/4452* (2013.01)

(58) Field of Classification Search
CPC .. G06F 3/0482; G06F 3/04842; G02B 6/4441
See application file for complete search history.

(56) References Cited

U.S. PATENT DOCUMENTS

| | | | |
|---|---|---|---|
| 5,339,379 A | 8/1994 | Kutsch et al. | |
| 5,394,503 A | 2/1995 | Dietz, Jr. et al. | |
| 5,758,002 A | 5/1998 | Walters | |
| 6,556,761 B1 | 4/2003 | Jennings et al. | |
| 6,760,531 B1 | 7/2004 | Solheid et al. | |
| 7,035,511 B1 | 4/2006 | Rhoney et al. | |
| 7,328,298 B2 | 2/2008 | Kamakura et al. | |
| 8,019,192 B2 | 9/2011 | Puetz et al. | |
| 8,171,406 B1 | 5/2012 | Newstadt et al. | |
| 8,867,883 B2 | 10/2014 | Crain et al. | |
| 8,934,252 B2 | 1/2015 | Anderson et al. | |
| 8,936,194 B1 | 1/2015 | Welch et al. | |
| 9,263,870 B2 | 2/2016 | Mann | |

(Continued)

OTHER PUBLICATIONS

Office action for U.S. Appl. No. 15/046,186, dated Nov. 18, 2016, Ellison et al., "Ultra-High Density Patch Systems", 10 pages.

(Continued)

*Primary Examiner* — Ellen Kim (74) *Attorney, Agent, or Firm* — Lee & Hayes, PLLC (57) ABSTRACT

A plurality of patch trays displaceably received in a chassis received in a left side or right side of an access side of a frame, and a splice tray removeably received in the access side of the frame. The splice tray having a capacity to receive at least about 288 fiber terminations and the plurality of patch trays displaceably received in the chassis having a capacity to collectively receive the at least about 288 fiber terminations from the splice tray. A patch tray including a row of pop-up adapter packs to collectively receive a respective portion of the at least about 288 fiber terminations received by the patch tray. The row of pop-up adapter packs arranged in the patch tray substantially in a left side or right side of the patch tray to offset the row of pop-up adapter packs to provide more space for routing the respective portion of the 288 fiber terminations in the patch tray.

16 Claims, 5 Drawing Sheets

(56) References Cited

U.S. PATENT DOCUMENTS

| | | |
|---|---|---|
| 9,488,796 B2 | 11/2016 | Smrha et al. |
| 9,823,432 B2 * | 11/2017 | Alexi .................. G02B 6/4452 |
| 2003/0007000 A1 | 1/2003 | Carlson et al. |
| 2003/0223723 A1 | 12/2003 | Massey et al. |
| 2004/0059539 A1 | 3/2004 | Otsuki et al. |
| 2004/0074852 A1 * | 4/2004 | Knudsen .............. G02B 6/4452 211/26 |
| 2004/0146266 A1 | 7/2004 | Solheid et al. |
| 2007/0106768 A1 | 5/2007 | Frietsch et al. |
| 2007/0180148 A1 | 8/2007 | Yadidian |
| 2008/0133831 A1 | 6/2008 | Delaney et al. |
| 2008/0145013 A1 | 6/2008 | Escoto et al. |
| 2008/0205028 A1 | 8/2008 | Papakos et al. |
| 2009/0097797 A1 | 4/2009 | Kewitsch |
| 2009/0097846 A1 | 4/2009 | Kozischek et al. |
| 2009/0147393 A1 | 6/2009 | Hakamata |
| 2009/0310929 A1 | 12/2009 | Reinhardt et al. |
| 2010/0061691 A1 | 3/2010 | Murano et al. |
| 2011/0038589 A1 | 2/2011 | Ruiz et al. |
| 2012/0266258 A1 | 10/2012 | Tuchman et al. |
| 2013/0028567 A1 | 1/2013 | Parikh et al. |
| 2013/0089292 A1 | 4/2013 | Ott et al. |
| 2014/0270676 A1 | 9/2014 | Ott et al. |
| 2014/0297013 A1 | 10/2014 | Huffine |
| 2015/0309278 A1 | 10/2015 | Ellison et al. |
| 2015/0309674 A1 | 10/2015 | Williams et al. |
| 2016/0047999 A1 * | 2/2016 | Alexi .................. G02B 6/4452 385/135 |

OTHER PUBLICATIONS

Office action for U.S. Appl. No. 14/698,456, dated Mar. 3, 2016, Ellison et al., "Ultra-High Density Frames", 21 pages.

Office action for U.S. Appl. No. 15/046,186, dated Apr. 3, 2017, Ellison et al., "Ultra-High Density Patch Systems", 6 pages.

Office action for U.S. Appl. No. 14/698,568, dated May 19, 2017, Williams et al., "Ultra-High Density Frames", 39 pages.

Office Action for U.S. Appl. No. 14/698,568, dated Sep. 22, 2017, Williams, "Ultra-High Density Frames", 42 pages.

* cited by examiner

ULTRA-HIGH DENSITY PATCH SYSTEMS

RELATED APPLICATIONS

This application claims priority to and is a continuation of U.S. patent application Ser. No. 15/046,186, filed on Feb. 17, 2016, the entire contents of which are incorporated herein by reference.

BACKGROUND

An important consideration in data communication equipment is circuit density. Most central data communication locations have limited space. Therefore, there is a need to reduce the size of data communication equipment, and install as much data communication equipment as possible in a relatively small space at a central data communication location.

For data communication manufacturers, making high density frames can be a challenging process in which engineers develop frames to meet the high density needs of the central data communication locations while protecting communication lines, maintaining bend radii of the communication lines, and managing massive amounts of the communication lines. This is particularly true for optical fiber communication lines, where the engineers create total front access (TFA) frames having a high density of optical fibers. Frames exist having a high density capacity of about 3,000 fiber terminations per frame, but the frames are not TFA, and instead require access to the backs of the frames. For example, in the case where the frame has a high density capacity of about 3,000 fiber terminations per frame, the splices are done at the back of the frame. Thus, a user must first splice cables at the back of the frame, and then traverse around a plurality of frames (e.g., a row of frames) to get to the front of the frame to patch the cables at the front of the frame the user is working on.

Moreover, when higher density capacities of fiber terminations are involved, the frames may be a dedicated splicing only frame or a dedicated patching only frame, resulting in a higher quantity of frames, and consuming more space. Further, when higher density capacities of fiber terminations are involved, footprints of the frames can become uncommon (i.e., not a standard size), resulting in uncommon space consumption in data communication locations. For example, when higher density capacities of fiber terminations are involved, a 23-inch mount (58-centimeter mount) frame may be designed to have a footprint of a width about 30 inches (76 centimeters) and a depth of about 24 inches (61 centimeters), which may be an uncommon footprint size used in central data communication locations and may be difficult to utilize with other existing frames and/or in relatively small spaces at the central data communication locations. Also, when higher density capacities of fiber terminations are involved, managing patch and splice portions of the fiber terminations in the frames can be difficult.

SUMMARY

Data communication apparatus are described which are configured to have a high density of fiber terminations per frame (e.g., 3000 or more), are total front access (TFA), and have a common footprint (e.g., a width of about 30 inches (76 centimeters) and a depth of about 36 inches (91 centimeters). Generally, the data communication apparatus include a total front access frame having fiber termination chassis that provide for splicing and patching the high volume of fiber terminations, while protecting the fibers and maintaining bend radii of the fibers. This summary is provided to introduce simplified concepts of ultra-high density patch systems, which are further described below in the Detailed Description. This summary is not intended to identify essential features of the claimed subject matter, nor is it intended for use in determining the scope of the claimed subject matter.

In some examples, a data communication apparatus can include a frame having an access side and a splice tray removeably received in the access side of the frame. In some examples, the splice tray can have a capacity to receive at least about 288 fiber terminations. The data communication apparatus can include a chassis received in a left side or right side of the access side of the frame. In some examples, the chassis includes a plurality of patch trays displaceably received in the chassis, and the plurality of patch trays can have a capacity to collectively receive the at least about 288 fiber terminations from the splice tray.

In other examples, a data communication apparatus includes a chassis to be received by a frame, and a plurality of patch trays can be displaceably received in the chassis. The data communication apparatus can include a breakout panel arranged with the chassis that manages (e.g., receives, routes, distributes, splits and/or divides) a plurality of fiber terminations. In some examples, the breakout panel can receive at least about 288 fiber terminations, and the breakout panel can include a plurality of breakout blocks. Each breakout block of the plurality of breakout blocks can split a respective portion of the at least about 288 fiber terminations, and each patch tray of the plurality of patch trays can receive the respective portion of the at least about 288 fiber terminations from each breakout block of the plurality of breakout blocks.

In another example, a data communication apparatus includes a patch tray displaceably receivable in a chassis. In some examples, the chassis can have a capacity to receive at least about 288 fiber terminations, and the patch tray can receive a respective portion of the at least about 288 fiber terminations received by the chassis. In some examples, the patch tray can include a row of pop-up adapter packs arranged in the patch tray substantially on a left side or a right side of the patch tray. The row of pop-up adapter packs can collectively receive the respective portion of the at least about 288 fiber terminations received by the patch tray.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to data communication apparatus having a plurality of patch trays displaceably received in a chassis received in a left side or a right side of an access side of a frame. The plurality of patch trays having a capacity to collectively receive at least about 288 fiber terminations from a splice tray removeably received in the access side of the frame. Because the plurality of patch trays displaceably received in the chassis have a capacity to collectively receive at least about 288 fiber terminations from a splice tray having capacity to receive the at least about 288 fiber terminations, a user can manage one displaceable conduit (e.g., riser tube, buffer tube, furcation tube, etc.) communicatively coupled between the splice tray and the chassis. In this way, a user (e.g., an installer, a technician, a splicer, an information systems technician, etc.) may route all of the 288 fiber terminations in much less time as compared to routing a plurality of displaceable conduits between respective patch trays and splice trays.

In another example, the chassis can include a breakout panel arranged with the chassis. The breakout panel can be arranged on a left side or a right side of the chassis above or below the splice trays and receive the at least about 288 fiber terminations. For example, the breakout panel may receive the displaceable conduit communicatively coupled to the splice tray and include a plurality of breakout blocks to split a respective portion of the at least about 288 fiber terminations. The breakout panel may also include a wall having a convex surface profile to provide a minimum bend radius of a respective portion of the at least about 288 fiber terminations and/or a fiber passage way to provide a minimum bend radius of a respective portion of the at least about 288 fiber terminations. Because the chassis may include a breakout panel, a user may route respective portions of the 288 fiber terminations to individual ones of the plurality of patch trays removeably received in the chassis in much less time as compared to routing a plurality of displaceable conduits between respective patch trays and splice trays. For example, because the breakout panel provides for routing respective portions of the 288 fiber termination to individual ones of the plurality of patch trays a user routes one displaceable conduit to the chassis rather than routing one displaceable conduit to a respective patch tray.

In another example, a patch tray of the plurality of patch trays displaceably received in the chassis can have a row of pop-up adapter packs arranged in the patch tray substantially on a left side or a right side of the patch tray. For example, the patch tray may have a row of pop-up adapter packs arranged in the patch tray substantially on a left side or a right side of the patch tray that can collectively receive a respective portion of the at least about 288 fiber terminations. For example, the respective portion of the at least about 288 fiber terminations received by the patch tray may comprise 900 micron fiber type terminations received on a left side or a right side of the patch tray, and the row of pop-up adapter packs further collectively receives at least about 48 jumper type fiber terminations, the at least about 48 jumper type fiber terminations exiting the patch tray on the left side or the right side opposite the 900 micron fiber type terminations. Because the row of pop-up adapter packs are arranged in the patch tray substantially on a left side or right side of the patch tray, the offset of the pop-up adapter packs provides more space for the at least about 48 jumper type fiber terminations to be routed with a minimum bend radius in the patch tray. For example, because the at least about 48 jumper type fiber terminations have a larger outside diameter (e.g., 1.6 millimeter or 2.0 millimeter) than an outside diameter of the 900 micron fiber type terminations, the at least about 48 jumper type fiber terminations require a larger minimum bend radius than the 900 micron fiber type terminations. Thus, the offset of the pop-up adapter packs provides more space for the at least about 48 jumper type fiber terminations to be routed with a minimum bend radius in the patch trays making it easier or less difficult for a user (e.g., an installer, a technician, a splicer, an information systems technician, etc.) to route all of the 48 fiber terminations in one single patch tray.

In another example, the patch tray can include a slack management bay arranged in a back or a front of the patch tray. The slack management bay provides for replacing (e.g., re-terminating) a damaged fiber termination connection of the respective portion of the at least about 288 fiber terminations received by the patch tray. For example, the slack management bay can provide for storing additional length of the respective portion of the at least about 288 fiber terminations comprising the 900 micron fiber type terminations received by the patch tray such that if a connection of one of the 900 micron fiber type terminations breaks or fails the additional length of the 900 micron fiber type terminations stored in the slack management bay can be used to replace the broken or failed connection.

Generally, a splice termination may be two separate fibers (e.g., separate pieces of glass) being joined together through a splice (e.g., joining two fibers end-to-end). And, a patch termination may be separate fibers (e.g., separate cables) terminated in a connector (e.g., Lucent Connectors (LCs), subscriber connectors (SC), etc.)) having an end condition (e.g., an angle-polished connector (APC) end condition or an ultra-polished connector (UPC) end condition). In the patch termination, the separate fibers terminated in the connector may then be inserted into an adapter (e.g., a coupler), where the adapter may provide for an additional cable (e.g., jumper) to be inserted into the opposite end providing a continuous path for light to pass through.

Illustrative Data Communication Apparatuses

Figure 1:
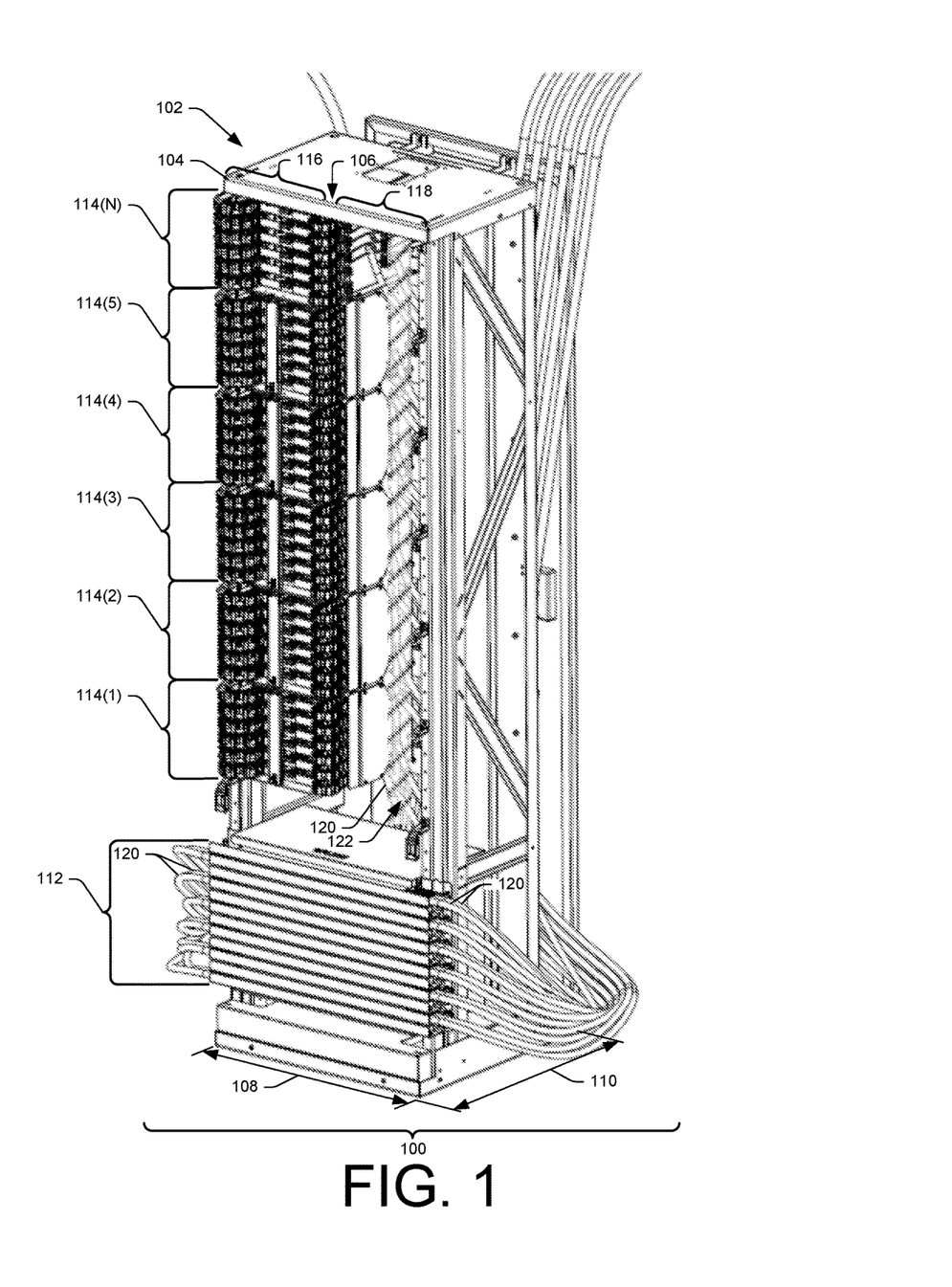
FIG. 1 illustrates a front view, a top view, a side view, and a perspective view of an example data communication apparatus having fiber blocks received in a frame.

FIG. 1 illustrates a perspective view 100 of an example data communication apparatus 102 having a frame 104 having an access side 106. In one example, the frame 104 may comprise a full frame with a footprint having a width 108 of about 24 inches (61 centimeters) and a depth 110 of about 36 inches (91 centimeters). In another example, the frame 104 may comprise a half frame with a footprint having a width 108 of about 24 inches (61 centimeters) and a depth of about 24 inches (61 centimeters).

FIG. 1 illustrates a plurality of splice trays 112 removeably received in the access side 106 of the frame 104. Each of the plurality of splice trays 112 can have a capacity to receive at least about 288 fiber terminations. FIG. 1 further illustrates a plurality of chassis 114(1), 114(2), 114(3), 114(4), 114(5) and 114(N) received in a left side 116 of the access side 106 of the frame 104, and another plurality of chassis 114(1)-114(N) can be received in a right side 118 of the access side 106 of the frame 104 (not shown). Each chassis of the plurality of chassis 114(1)-114(N) can have a capacity to receive the at least about 288 fiber terminations from a respective splice tray 112. For example, each chassis of the plurality of chassis 114(1)-114(N) can include a plurality of patch trays displaceably received in the chassis that have a capacity to collectively receive the at least about 288 fiber terminations from a respective splice tray 112 (discussed in detail below with regards to FIGS. 2 and 3).

FIG. 1 illustrates a plurality of displaceable conduits 120 (e.g., a deformable tube, a buffer tube, a furcation tube, etc.) arranged with the plurality of splice trays 112. For example, each splice tray of the plurality of splice trays 112 can have two displaceable conduits 120 communicatively coupled in a front right side of the splice tray or a front left side of the splice tray. One of the two displaceable conduits 120 having capacity to contain the at least about 288 fiber terminations received by the splice tray and a second displaceable conduit of the two displaceable conduits 120 having capacity to contain the at least about 288 fiber terminations exiting the splice tray and communicatively coupled to at least one chassis of the plurality of chassis 114(1)-114(N) (discussed in detail below with regards to FIGS. 2 and 3).

FIG. 1 illustrates a fiber management bay 122 (represented by a lined hatch pattern) arranged substantially at a middle of the width 108 of the frame 104. FIG. 1 illustrates the first chassis 114(1) can be received in the left side 116 of the access side 106 and adjacent to the fiber management bay 122 and a second chassis (not shown) can be arranged opposite to the first chassis 114(1) and received in the right side 118 of the access side 106 of the frame 104 adjacent to the fiber management bay 122. FIG. 1 also illustrates the plurality of chassis 114(1)-114(N) can be received in the left side 116 of the access side 106 of the frame 104 adjacent to the fiber management bay 122 and another plurality of chassis 114(1)-114(N) (not shown) can be arranged opposite to the plurality of chassis 114(1)-114(N) received in the right side 118 of the access side 106 and adjacent to the fiber management bay 122. The fiber management bay 122 arranged between the plurality of chassis 114(1)-114(N) arranged on the left side 116 and the plurality of chassis 114(1)-114(N) arranged on the right side 118 can provide for routing the displaceable conduits 120 from the plurality of splice trays 112 to the left and right side plurality of chassis 114(1)-114(N).

While FIG. 1 illustrates the plurality of chassis 114(1)-114(N) arranged above the plurality of splice trays 112 displaceably received in the access side 106 of the frame 104, the plurality of chassis 114(1)-114(N) and the plurality of splice trays 112 can be arranged in other ways in the access side 106 of the frame 104. For example, the splice trays 112 can be displaceably received proximate to a middle and/or a top of the access side 106 of the frame 104 and the plurality of chassis 114(1)-114(N) can be received in the access side 106 of the frame 104 below plurality of splice trays 112.

In another example, the frame 104 may meet Zone 4 seismic specifications. For example, the frame may include primary load baring posts that are positioned substantially in a middle of the right and left sides of the frame 104, and secondary load bearing posts. Specifically, in a Zone 4 geographic area, there is a one in ten chance of experiencing a seismic event having an acceleration level of 0.04 times that of gravity in the next fifty years. This compliance is possible via a stress transfer from the secondary load bearing posts to the primary load bearing posts.

Illustrative Patch Chassis

Figure 2:
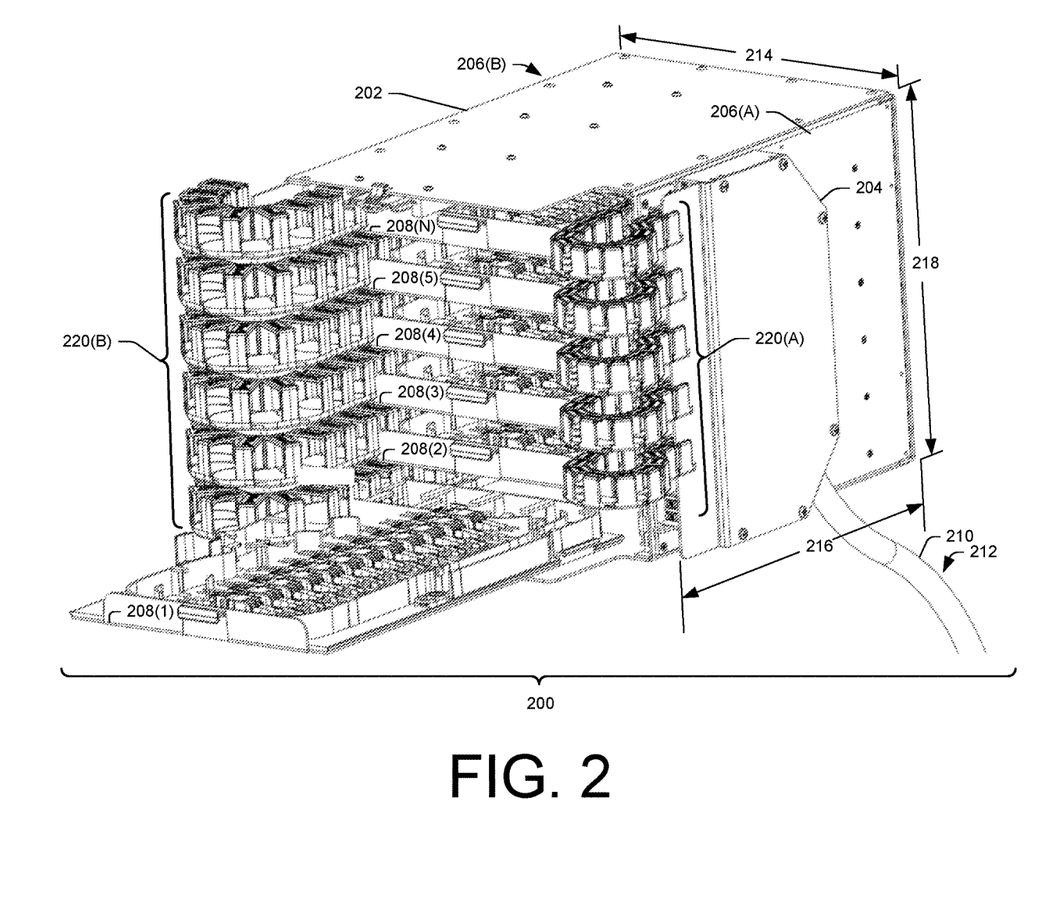
FIG. 2 illustrates a perspective view of an example chassis receivable by the frame shown in FIG. 1 and a breakout panel attached to a right side of the chassis.

FIG. 2 illustrates a perspective view 200 of an example chassis 202 receivable by the frame 104 shown in FIG. 1 with a breakout panel 204 attached to a right outside surface 206(A) of the chassis 202 opposite a left outside surface 206(B) of the chassis 202. The chassis 202 including a plurality of patch trays 208(1), 208(2), 208(3), 208(4), 208(5), and 208(N) displaceably received in the chassis 202. For example, each of the patch trays 208(1)-208(N) may be fixed to slide rails (e.g., plastic slide rales, metal slide rails, composite slide rails, etc.) fixed to the inside of the chassis 202. The patch trays 208(1)-208(N) displaceably received in the chassis 202 such that each of the patch trays 208(1)-208(N) are displaceable between a stowed position and an open position. When in the stowed position the patch trays 208(1)-208(N) are arranged in the chassis 202, and when in the open position the patch trays 208(1)-208(N) are arranged out in front of the chassis.

The breakout panel 204 attached to the right outside surface 206(A) of the chassis 202 may receive a displaceable conduit 210 (e.g., a deformable tube, a buffer tube, a furcation tube, etc.) communicatively coupled to a splice tray (e.g., a splice tray of the plurality of splice trays 112 shown in FIG. 1). The displaceable conduit 210 may have an outside diameter of about 0.6 inches (1.5 centimeters) and may contain at least about 288 fiber terminations 212 received from the splice tray. In one example, the at least about 288 fiber terminations 212 may comprise ribbon fiber terminations.

In one example, the chassis 202 may have a width 214 of about 9.75 inches (25 centimeters), a depth 216 of about 10.6 inches (27 centimeters), and a height 218 of about 9.4 inches (24 centimeters). In another example, the chassis 202 may have a width 214 of at least about 5 inches (13 centimeters) to at most about 15 inches (38 centimeters), a depth 216 of at least about 5 inches (13 centimeters) to at most about 15 inches (38 centimeters), and a height 218 of at least about 5 inches (13 centimeters) to at most about 15 inches (38 centimeters).

FIG. 2 illustrates flexible members 220(A) communicatively coupled to the breakout panel 204 and the right side of the patch trays 208(1)-208(N), and flexible members 220(B) communicative coupled to the left side of the patch trays 208(1)-208(N). The flexible members 220(A) and 220(B) are arranged with the patch trays 208(1)-208(N) to maintain a minimum bend radius of the at least about 288 fiber terminations. For example, the flexible members 220(A) maintain a minimum bend radius of respective portions of the 900 micron fiber type terminations coming from the breakout panel 204 and received by a patch tray of the plurality of patch trays 208(1)-208(N) and the flexible members 220(B) maintain a minimum bend radius of respective portions of the jumper type fiber terminations exiting the patch trays 208(1)-208(N). When a patch tray is slideably displaced in and/or out of the chassis 202, the flexible members fixed to the right and left sides of the patch tray flexibly displace along with the patch tray while maintaining a minimum bend radius to protect the fibers contained in the flexible members.

Figure 3:
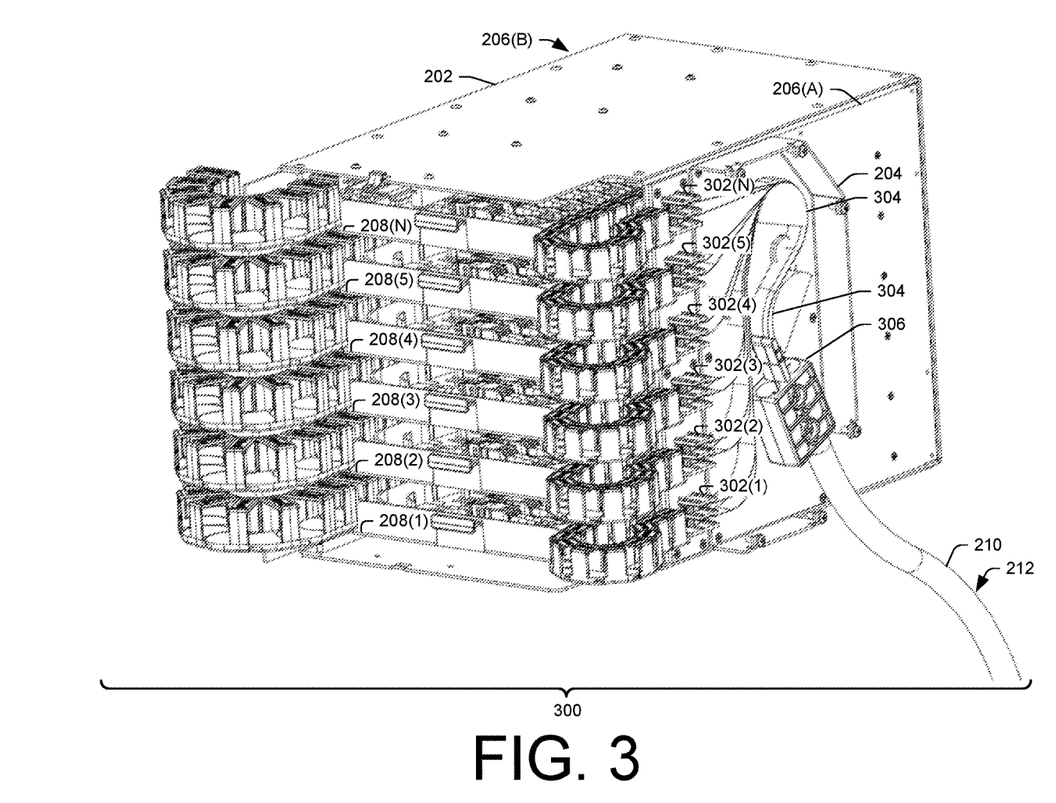
FIG. 3 illustrates a perspective view the example chassis shown in FIG. 2 with a cover of the breakout panel removed and showing the inside fiber management features of the breakout panel.

FIG. 3 illustrates a perspective view 300 of the example chassis 202 shown in FIG. 2 with a cover of the breakout panel 204 removed showing the inside fiber management features of the breakout panel 204. The fiber management features of the breakout panel 204 can include a plurality of breakout blocks 302(1), 302(2), 302(3), 302(4), 302(5) and 302(N). Each of the breakout blocks 302(1)-302(N) may be arranged on the right outside surface 206(A) of the chassis 202 or the left outside surface 206(B) of the chassis 202. Each of the breakout blocks 302(1)-302(N) are arranged to split a portion of the at least about 288 fiber terminations 212 for a patch tray of the plurality of patch trays 208(1)-208(N). For example, the portion of the at least about 288 fiber terminations may comprises a quantity of at least about 4 ribbon fiber terminations, each ribbon fiber termination comprising a quantity of at least about 12 fiber terminations, and each breakout block 302(1)-302(N) is arranged to split about 48 fiber terminations for a respective patch tray of the plurality of patch trays 208(1)-208(N).

The fiber management features of the breakout panel 204 can include one or more walls 304 having a convex surface profile to provide a minimum bend radius of at least a portion of the at least about 288 fiber terminations. The fiber management features of the breakout panel 204 can also include a first convex passageway side opposite a second convex passageway side, the first and second convex passageway sides defining a fiber passageway to provide a minimum bend radius of the respective portion of the at least about 288 fiber terminations. The at least about 288 fiber terminations 212 may exit the displaceable conduit 210 at a box 306 (e.g., a junction box, a clamp box, strain relief box, a gang box, etc.). For example, the at least about 288 fiber terminations 212 may comprise about 24 ribbon fiber terminations exiting the displaceable conduit at the box 306, each ribbon fiber termination comprising at least about 12 fiber terminations, and the 24 ribbon fiber terminations exiting the displaceable conduit 210 being routed via the breakout panel 204.

Illustrative Patch Trays

Figure 4:
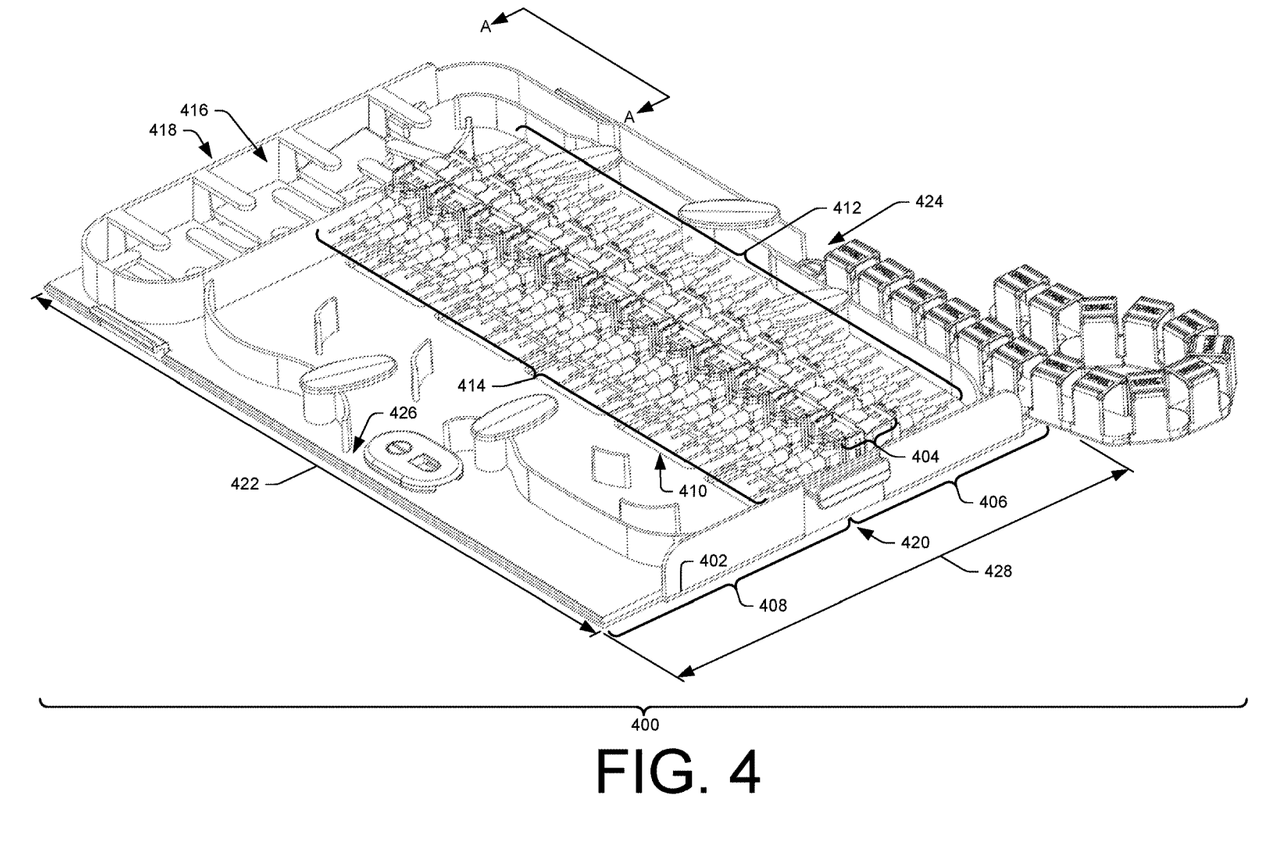
FIG. 4 illustrates a perspective view of an example patch tray displaceably receivable by the example chassis shown in FIGS. 2 and 3.

FIG. 4 illustrates a perspective view 400 of an example patch tray 402 displaceably receivable by the example chassis 202 shown in FIGS. 2 and 3. The patch tray 402 including a row of pop-up adapter packs 404 arranged in the patch tray 402 substantially on a right side 406 of the patch tray 402 adjacent to a left side 408 of the patch tray 402. Each of the pop-up adapter packs of the row of pop-up adapter packs 404 may include connectors (e.g., Lucent Connectors (LCs), subscriber connectors (SC), etc.), fixed to a displaceable plate. Apertures 410 may be arranged in the patch tray 402 below of each of the pop-up adapter packs of the row of pop-up adapter packs 404 to provide bottom access to a release mechanism for each of the pop-up adapter packs of the rows of pop-up adapter packs 404. The row of pop-up adapter packs 404 can collectively receive the respective portion of the at least about 288 fiber terminations. For example, the respective portion of the at least about 288 fiber terminations received by the patch tray may comprise 900 micron fiber type terminations 412 received by a first side (e.g., a right side) of the row of pop-up adapter packs 404. Each pop-up adapter pack of the rows of pop-up adapter packs 404 may receive at least about 4 of the 900 micron fiber type terminations 412 on the first side of the pop-up adapter pack.

The row of pop-up adapter packs 404 may collectively receive at least about 48 jumper type fiber terminations 414 on a second side (e.g., a left side) of the row of pop-up adapter packs 404 adjacent to the first side of the row of pop-up adapter packs 404. The at least about 48 jumper type fiber terminations 414 arranged to exit the patch tray 402 on the left side 408 of the patch tray 402 opposite the 900 micron fiber type terminations 412 entering the patch tray 402 on the right side 406 of the patch tray 402. For example, fiber management features arranged in the left side 408 of the patch tray 402 can include a plurality of walls having convex surface profiles to provide minimum bend radii of the jumper type fiber terminations 414 while routing the jumper type fiber terminations 414 out the left side 408 of the patch tray 402. The fiber management features of the patch tray 402 can also include a first convex passageway side opposite a second convex passageway side, the first and second convex passageway sides defining a fiber passageway to provide a minimum bend radius of the jumper type fiber terminations 414.

With the row of pop-up adapter packs 404 arranged in the patch tray 402 substantially on the right side 406 of the patch tray 402, the offset of the row of pop-up adapter packs 404 provides more space for the at least about 48 jumper type fiber terminations 414 to be routed with a minimum bend radius towards the left side 408 of the patch tray 402. For example, because the at least about 48 jumper type fiber terminations 414 have a larger outside diameter (e.g., 1.6 millimeter or 2.0 millimeter) than an outside diameter of the 900 micron fiber type terminations 412, the at least about 48 jumper type fiber terminations 414 require a larger minimum bend radius than the 900 micron fiber type terminations 412 and the offset provides more space for the at least about 48 jumper type fiber terminations 411 to be routed to exit the left side 408 of the patch tray 402. The minimum bend radius of the jumper type fiber terminations 414 may be at least about 1.18 inches (30 millimeters). The minimum bend radius of the 900 micron fiber type terminations may be at least about 0.63 inches (16 millimeters).

While FIG. 4 illustrates the pop-up adapter packs 404 arranged in the patch tray 402 substantially on the right side 406 of the patch tray 402, the pop-up adapter packs 404 may be arranged in the patch tray 402 substantially on the left side 408 of the patch tray 402. In an example where the pop-up adapter packs 404 are arranged in the patch tray 402 substantially on the left side 408 of the patch tray 402, the 900 micron fiber type terminations 412 may enter the patch tray 402 on the left side and the 48 jumper type fiber terminations may enter the patch tray 402 on the right side of the patch tray 402.

FIG. 4 illustrates the patch tray 402 can include a slack management bay 416 arranged in a back 418 of the patch tray 402 opposite a front 420 of the patch tray 402. While FIG. 4 illustrates the slack management bay 416 arranged in the back 418 of the patch tray 402, the slack management bay 416 could be arranged in the front 420 of the patch tray 402. The slack management bay 416 provides for containing additional length of the 900 micron fiber type terminations 412 entering the patch tray 402. The additional length of the 900 micron fiber type terminations 412 is stored in the slack management bay 416 in an event that it is necessary to replace a damaged fiber termination connection of the 900 micron fiber type terminations 412 entering the patch tray 402.

In one example, the patch tray 402 may have a depth 422 of about 12 inches (30 centimeters). In another example, the patch tray 402 may have a depth 422 of at least about 6 inches (15 centimeters) to at most about 18 inches (46 centimeters). The 900 micron fiber type terminations may enter the patch tray 402 substantially at a middle 424 of the patch tray 402. For example, the 900 micron fiber type terminations may exit a flexible member attached at the middle 424 of the patch tray 402 and enter the patch tray 402 at the middle 424 of a right side facing wall of the patch tray 402. Also, the at least about 48 jumper type fiber terminations 411 may exit the left side 408 of the patch tray 402 substantially at the middle 426 of the left side of the patch tray 402.

FIG. 4 illustrates, in one example, the patch tray 402 may have a width 428 of about 8 inches (20 centimeters). In another example, the patch tray 402 may have a width 428 of at least about 4 inches (10 centimeters) to at most about 12 inches (30 centimeters). FIG. 4 illustrates a section line A-A. The section line A-A is approximate to the back 418 of the patch tray 402.

Figure 5:
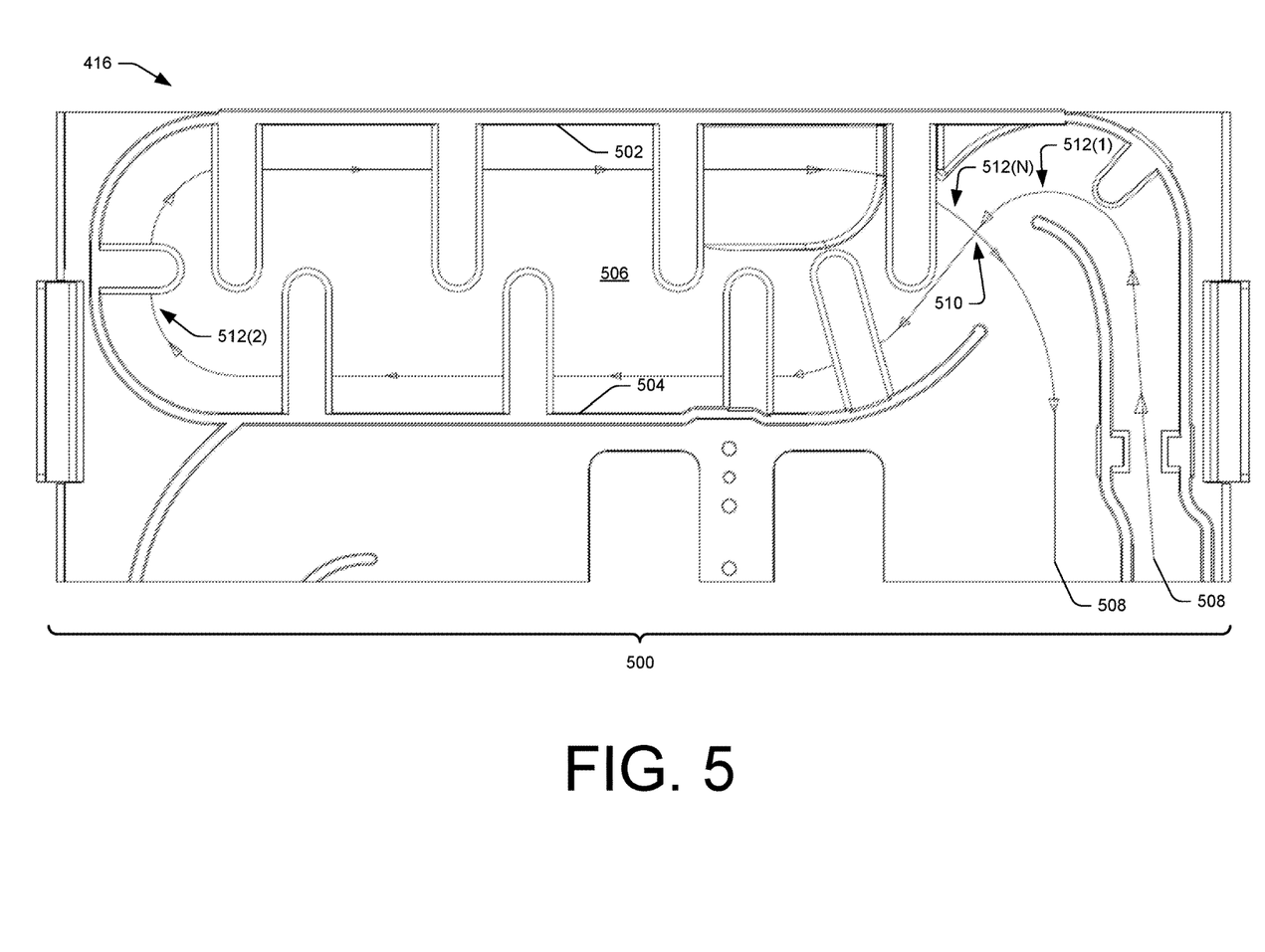
FIG. 5 illustrates a detail view of an example slack management bay arranged in the example patch tray shown in FIG. 4.

FIG. 5 illustrates detail view 500 that shows the slack management bay 416 taken along the section line A-A. Detail view 500 illustrates the slack management bay 416 can include a first passageway side 502 and a second passageway side 504 opposite the first passageway side 502. The first and second passageway sides 502 and 504 defining a fiber passageway 506. FIG. 5 illustrates a routing 508 (shown as an arrowed line) of the fiber passageway 506. The routing 508 of the fiber passageway 506 showing the respective portion of the at least about 288 fiber terminations having a cross-over 510 and minimum bend radii 512(1), 512(2) and 512(N). For example, the 900 micron fiber type terminations may enter the patch tray 402 substantially at the middle 424 of the patch tray 402, follow the routing 508 to a minimum bend radius 512(1), follow the routing 508 along the second passageway side 504 to a minimum bend radius 512(2), follow the routing 508 along the first passageway side 502 to a minimum bend radius 512(N) where the 900 micron fiber type terminations follow the routing 508 to the cross-over 510. At the cross-over 510, the 900 micron fiber type terminations routed from the minimum bend radius 512(N) cross-over the 900 micron fiber type terminations coming from the minimum bend radius 512(1). After the cross-over 510, the 900 micron fiber type terminations are routed to the pop-up adapter packs 404 arranged in the patch tray 402 substantially on the right side 406 of the patch tray 402. Because the routing 508 includes the cross-over 510, the length 422 of the patch tray is at least about 2 inches less than a length of the patch tray having a routing that does not include a cross-over. This is because an additional 2 inches in the length 422 of the patch tray 402 would be needed to include another minimum bend radius to route the 900 micron fiber type terminations to the pop-up adapter packs 404.

While FIG. 5 illustrates the routing 508 of the fiber passageway 506 having a cross-over 510, the routing of the fiber passageway may not have a cross-over. For example, the routing of the 900 micron fiber type terminations may not have a cross-over, and instead the slack management bay 416 may have another minimum bend radius to route the 900 micron fiber type terminations to the pop-up adapter packs 404. In this example where the fiber passageway 506 does not have a cross-over, the length 422 of the patch tray is at least about 2 inches more than a length of a patch tray having a routing that does include a cross-over.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A data communication apparatus comprising:
a patch tray;
a row of pop-up adapter packs arranged in the patch tray substantially on a left side or a right side of the patch tray;
a slack management bay arranged adjacent to the row of pop-up adapter packs and in a back of the patch tray or in a front of the patch tray, the slack management bay sized to accommodate a length of fiber terminations entering the patch tray; and
a flexible member communicatively coupled at a center of either the left side or the right side of the patch tray and communicatively coupled to the slack management bay,
wherein the flexible member is arranged to maintain a minimum bend radius of the fiber terminations entering the patch tray when the patch tray is displaced.

2. The data communication apparatus of claim 1, wherein the slack management bay includes:
a first passageway side; and
a second passageway side opposite the first passageway side, and
wherein the first and second passageway sides define a fiber passageway, the fiber passageway routing the additional length of fiber terminations with a cross-over and a minimum bend radius.

3. The data communication apparatus of claim 1, wherein the fiber terminations are 900 micron fiber type terminations, and
wherein a side of the row of pop-up adapter packs collectively receives the 900 micron fiber type terminations.

4. The data communication apparatus of claim 1, wherein a side of the row of pop-up adapter packs collectively receives a quantity of about 48 jumper fiber terminations.

5. The data communication apparatus of claim 1, wherein the patch tray has a width of about 8 inches and a depth of about 12 inches.

6. A data communication apparatus comprising:
a patch tray having a front opposite a back,
a row of pop-up adapter packs arranged from the front to the back substantially on a left side or a right side of the patch tray, each pop-up adapter pack in the row of pop-up adapter packs including connectors fixed to a displaceable plate, a first side of the row of pop-up adapter packs collectively receiving a first type of fiber terminations, and a second side of the row of pop-up adapter packs, opposite the first side of the row of pop-up adapter packs, collectively receiving a second type of fiber terminations different from the first type of fiber terminations; and
a slack management bay arranged adjacent to the row of pop-up adapter packs and in a back of the patch tray or in a front of the patch tray, the slack management bay sized to accommodate a length of the first type fiber terminations collectively received by the first side of the pop-up adapter packs.

7. The data communication apparatus of claim 6, wherein the first type of fiber terminations are 900 micron fiber type terminations.

8. The data communication apparatus of claim 6, wherein the second type of fiber terminations are jumper type fiber terminations.

9. The data communication apparatus of claim 8, wherein the jumper type fiber terminations includes about 48 jumper type fiber terminations.

10. The data communication apparatus of claim 6, wherein the first type of fiber terminations are 900 micron fiber type terminations received on the left side or the right side of the patch tray, and the second type of fiber terminations are jumper type fiber terminations exiting the patch tray on the left side or the right side of the patch tray opposite the 900 micron fiber type terminations.

11. The data communication apparatus of claim 10, wherein the jumper type fiber terminations exiting the patch tray on the left side or the right side of the patch tray opposite the 900 micron fiber type terminations includes a quantity of about 48 jumper type fiber terminations.

12. The data communication apparatus of claim 6, wherein the patch tray has a depth of about 12 inches and a width of about 8 inches.

13. A data communication apparatus comprising:
a patch tray;
a row of pop-up adapter packs arranged in the patch tray substantially on a left side or a right side of the patch tray;
a slack management bay arranged adjacent to the row of pop-up adapter packs and in a back of the patch tray or in a front of the patch tray, the slack management bay including:
a first passageway side, and
a second passageway side opposite the first passageway side, the first and second passageway sides defining a fiber passageway, the fiber passageway routing fiber terminations with a cross-over and a minimum bend radius; and
a flexible member communicatively coupled at a center of either the left side or the right side of the patch tray and communicatively coupled to the fiber passageway of the slack management bay,
wherein the flexible member is arranged to maintain a minimum bend radius of fiber terminations entering the patch tray when the patch tray is displaced.

14. The data communication apparatus of claim 13, wherein a side of the row of pop-up adapter packs is configured to collectively receive the fiber terminations.

15. The data communication apparatus of claim 13, wherein a side of the row of pop-up adapter packs is configured to collectively receive jumper type terminations.

16. The data communication apparatus of claim 13, wherein the patch tray has a depth ranging from about 6 inches to about 18 inches.

* * * * *